(12) United States Patent
Aadland (10) Patent No.: US 11,946,791 B2
(45) Date of Patent: Apr. 2, 2024

(54) MEASURING ARRANGEMENT AND MEASURING SYSTEM, IN PARTICULAR FOR A LIQUID SENSOR

(71) Applicant: Wema System AS, Blomsterdalen (NO)

(72) Inventor: Harald Aadland, Blomsterdalen (NO)

(73) Assignee: Wema System AS, Blomsterdalen (NO)

( * ) Notice: Subject to any disclaimer, the term of this patent is extended or adjusted under 35 U.S.C. 154(b) by 23 days.

(21) Appl. No.: 16/745,537

(22) Filed: Jan. 17, 2020

(65) Prior Publication Data

US 2020/0232839 A1    Jul. 23, 2020

(30) Foreign Application Priority Data

Jan. 22, 2019 (DE) .......................... 102019101517.0

(51) Int. Cl.
*G01F 23/72* (2006.01)
*H01H 36/02* (2006.01)

(52) U.S. Cl.
CPC ............. *G01F 23/72* (2013.01); *H01H 36/02* (2013.01); *H01H 2231/038* (2013.01)

(58) Field of Classification Search
CPC ........ G01F 23/38; G01F 23/46; G01F 23/546; G01F 23/62; G01F 23/72; G01F 23/74; H01H 36/02; H01H 2231/038
See application file for complete search history.

(56) References Cited

U.S. PATENT DOCUMENTS

| | | | | |
|---|---|---|---|---|
| 3,678,750 | A * | 7/1972 | DiNoia ................... | G01F 23/72 73/313 |
| 4,976,146 | A * | 12/1990 | Senghaas ................ | G01F 23/74 200/84 C |
| 7,513,393 | B2 * | 4/2009 | Kotyk ...................... | B67D 7/16 222/386 |
| 8,763,455 | B1 * | 7/2014 | Chang .................... | G01F 23/72 73/311 |
| 2011/0138907 | A1 | 6/2011 | Rudd et al. | |
| 2013/0037138 | A1 | 2/2013 | Georis | |

FOREIGN PATENT DOCUMENTS

| | | |
|---|---|---|
| CN | 2624185 Y | 7/2004 |
| CN | 201392228 Y | 1/2010 |
| CN | 203100833 U | 7/2013 |
| CN | 108072426 A | 5/2018 |
| WO | 2008047377 A1 | 4/2008 |

OTHER PUBLICATIONS

German Office Action, Application 10 2019 101 517.0, dated Aug. 17, 2022, 10 pages.

* cited by examiner

*Primary Examiner* — Justin N Olamit
(74) *Attorney, Agent, or Firm* — Barley Snyder (57) ABSTRACT

A measuring arrangement includes a first magnetic switch having a first contact and a second contact, and a second magnetic switch having a first contact and a second contact. A first evaluation terminal is connected to the first contact of each of the first magnetic switch and the second magnetic switch. A first resistor is arranged between the second contact of the first magnetic switch and the second contact of the second magnetic switch. A second evaluation terminal is connected to the second contact of the first magnetic switch. A third evaluation terminal connected to the second contact of the second magnetic switch.

20 Claims, 9 Drawing Sheets

MEASURING ARRANGEMENT AND MEASURING SYSTEM, IN PARTICULAR FOR A LIQUID SENSOR

CROSS-REFERENCE TO RELATED APPLICATION

This application claims the benefit of the filing date under 35 U.S.C. § 119(a)-(d) of German Patent Application No. 102019101517.0, filed on Jan. 22, 2019.

FIELD OF THE INVENTION

The present invention relates to a measuring arrangement and a measuring system and, more particularly, to a measuring arrangement and a measuring system for a liquid sensor.

BACKGROUND

To determine the level of liquid in a container, it is known to use magnetic switches and floats with a magnetic field. Depending on the position of the float within the container, the magnetic switch can be switched on or off in the process, and the switching state of the magnetic switch provides information about the position of the float and thus the filling level of the container. Such a system is disclosed in United States patent application 2013/0037138 A1. The container can be designed as a liquid tank.

SUMMARY

A measuring arrangement includes a first magnetic switch having a first contact and a second contact, and a second magnetic switch having a first contact and a second contact. A first evaluation terminal is connected to the first contact of each of the first magnetic switch and the second magnetic switch. A first resistor is arranged between the second contact of the first magnetic switch and the second contact of the second magnetic switch. A second evaluation terminal is connected to the second contact of the first magnetic switch. A third evaluation terminal connected to the second contact of the second magnetic switch.

BRIEF DESCRIPTION OF THE DRAWINGS

The invention will now be described by way of example with reference to the accompanying Figures, of which.

DETAILED DESCRIPTION OF THE EMBODIMENT(S)

The present invention will be described in greater detail below with reference to the embodiments illustrated in the following figures. The same parts are provided with the same reference numerals and the same component names. Furthermore, individual features or combinations of features from the embodiments shown and described can also represent independent inventive solutions or solutions in accordance with the invention.

Figure 1:
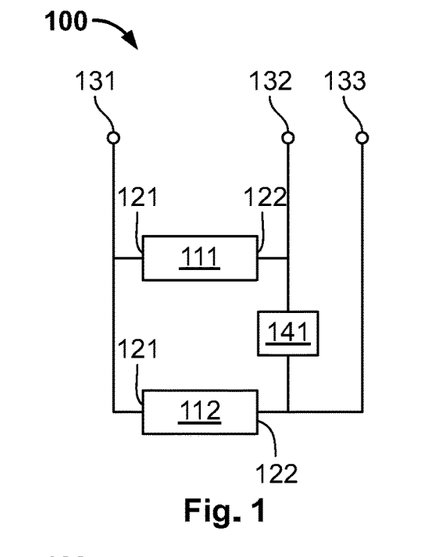
FIG. 1 is a circuit diagram of a measuring arrangement according to an embodiment.

A measuring arrangement 100 according to an embodiment, as shown in FIG. 1, has a first magnetic switch 111 and a second magnetic switch 112. Each of the magnetic switches 111, 112 has a first contact 121 connected to a first evaluation terminal 131. A first resistor 141 is arranged between a second contact 122 of each of the magnetic switches 111, 112. The second contact 122 of the first magnetic switch 111 is connected to a second evaluation terminal 132. The second contact 122 of the second magnetic switch 112 is connected to a third evaluation terminal 133. In an embodiment, the magnetic switches 111, 112 are reed switches.

In an embodiment, the magnetic switches 111, 112 are switched on in the presence of a magnetic field and switched off in the absence of a magnetic field. If a magnetic field acts on the first magnetic switch 111 and not on the second magnetic switch 112, then the first magnetic switch 111 is switched on and the second magnetic switch 112 is switched off. A resistance of 0 ohms can therefore be tapped between the first evaluation terminal 131 and the second evaluation terminal 132, and a resistance corresponding to the first resistor 141 can be tapped between the first evaluation terminal 131 and the third evaluation terminal 133. If, in a measuring method, no resistance is tapped between the first evaluation terminal 131 and the second evaluation terminal 132, and a resistance, which corresponds to the first resistor 141, is tapped between the first evaluation terminal 131 and the third evaluation terminal 133, the position of a first magnetic field switching the first magnetic switch 111 can thereby be determined at the level of the first magnetic switch 111. If this magnetic field is caused by the float of a liquid metering system, a range in the vicinity of the first magnetic switch 111 can thereby be concluded for a liquid level. If the float now moves along the measuring arrangement 100 such that no longer the first magnetic switch 111, but rather the second magnetic switch 112 is turned on, then between the first evaluation terminal 131 and the second evaluation terminal 132, a resistance corresponding to the first resistance 141, can be tapped, while between the first evaluation terminal 131 and the third evaluation terminal 133, a resistance of 0 ohms can be tapped. As a result, a movement of a magnetic field along the measuring arrangement 100 can be determined.

In another embodiment, the magnetic switches 111, 112 are switched off in the presence of a magnetic field and switched on in the absence of a magnetic field. The measuring principle is then identical, wherein at a position of the float in the region of the first magnetic switch 111 between the first evaluation terminal 131 and the second evaluation terminal 132, a resistance corresponding to the first resistor 141 is tapped and between the first evaluation terminal 131 and the third evaluation terminal 133 no resistance is tapped and the position of a magnetic field switching the first magnetic switch 111 is determined at the level of the first magnetic switch 111. If the float then moves into the region of the second magnetic switch 112, no resistance can be tapped between the first evaluation terminal 131 and the second evaluation terminal 132, and a resistance corresponding to the first resistor 141 can be tapped between the first evaluation terminal 131 and the third evaluation terminal 133, and from this the position of the float is determined to be in the region of the second magnetic switch 112.

Figure 2:
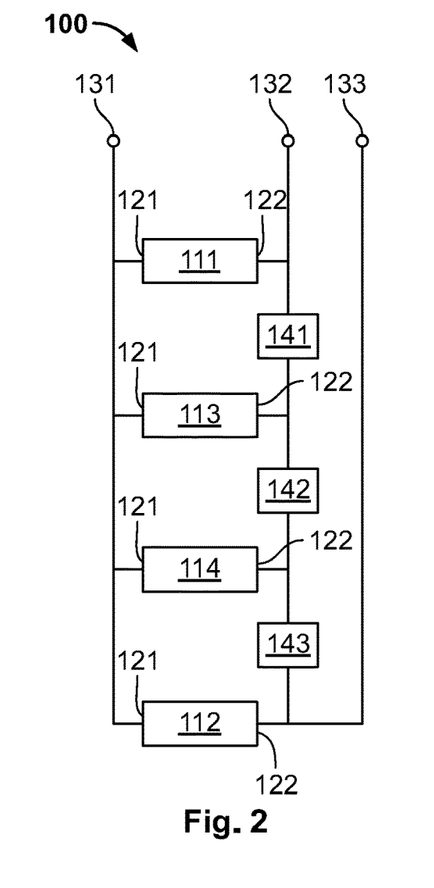
FIG. 2 is a circuit diagram of a measuring arrangement according to another embodiment.

A measuring arrangement 100 according to another embodiment is shown in FIG. 2. Like reference numbers indicate like elements, and only the differences from the measuring arrangement 100 shown in FIG. 1 will be described in detail herein.

As shown in FIG. 2, between the second contact 122 of the first magnetic switch 111 and the second contact 122 of the second magnetic switch 112, further resistors, here a second resistor 142 and a third resistor 143 are arranged. In each case, between the resistors 141, 142, 143 further second contacts 122 of further magnetic switches are arranged, here between a third magnetic switch 113 and a fourth magnetic switch 114, respectively. First contacts 121 of the third and fourth magnetic switches 113, 114 are connected to the first evaluation terminal 131. The second contact 122 of the third magnetic switch 113 is arranged between the first resistor 141 and the second resistor 142, and the second contact 122 of the fourth magnetic switch 114 is arranged between the second resistor 142 and the third resistor 143. The second contact 122 of the second magnetic switch 112 is connected to the third resistor 143.

If a magnetic field is now moved along the magnetic switches 111, 113, 114, 112 shown in FIG. 2, other circuit diagrams and switching positions result than those described for FIG. 1. If there is a magnetic field in the region of the first magnetic switch 111, so that the first magnetic switch 111 is switched on and the other magnetic switches 112, 113, 114 are switched off, no resistance can be tapped between the first evaluation terminal 131 and the second evaluation terminal 132. Between the first evaluation terminal 131 and the third evaluation terminal 133, a resistance corresponding to the sum of the first resistor 141, the second resistor 142 and the third resistor 143 can be tapped. If the magnetic field now moves along the magnetic switches 111, 113, 114, 112 in such a way that now the third magnetic switch 113 is switched on and the first magnetic switch 111, the fourth magnetic switch 114 and the second magnetic switch 112 are switched off, then between the first evaluation terminal 131 and the second evaluation terminal 132, a resistance corresponding to the first resistor 141 can be tapped. Between the first evaluation terminal 131 and the third evaluation terminal 133, a resistance corresponding to the sum of the second resistor 142 and the third resistor 143 can then be tapped. If the magnetic field moves further in the direction of the fourth magnetic switch 114, then a resistance which corresponds to the sum of the first resistor 141 and the second resistor 142 can be tapped between the first evaluation terminal 131 and the second evaluation terminal 132. Between the first evaluation terminal 131 and the third evaluation terminal 133, a resistance corresponding to the third resistor 143 can be tapped. If the magnetic field continues to move in the direction of the second magnetic switch 112 in such a way that only the second magnetic switch 112 is switched on, then a resistance, which corresponds to the sum of the first resistor 141, the second resistor 142 and the third resistor 143, can be tapped between the first evaluation terminal 131 and the second evaluation terminal 132, while between the first evaluation terminal 131 and the third evaluation terminal 133 no resistance can be tapped.

The tapped resistances can be determined by a resistance measurement between the first evaluation terminal 131 and the second evaluation terminal 132 or third evaluation terminal 133. This results in each case in a measured value between the first evaluation terminal 131 and the second evaluation terminal 132 or between the first evaluation terminal 131 and the third evaluation terminal 133 for each position of the magnetic field associated with one of the magnetic switches 111, 112, 113, 114. Should the possibility of correspondingly determining the resistance between these evaluation terminals fail, it is still possible to deduce a position of a magnetic field in comparison with the magnetic switches 111, 112, 113, 114 via the second measuring circuit. As a result, the reliability of the measuring arrangement 100 can be increased. In an embodiment, the resistors 141, 142, 143 are identical and each have an identical resistance value in ohms.

Figure 3:
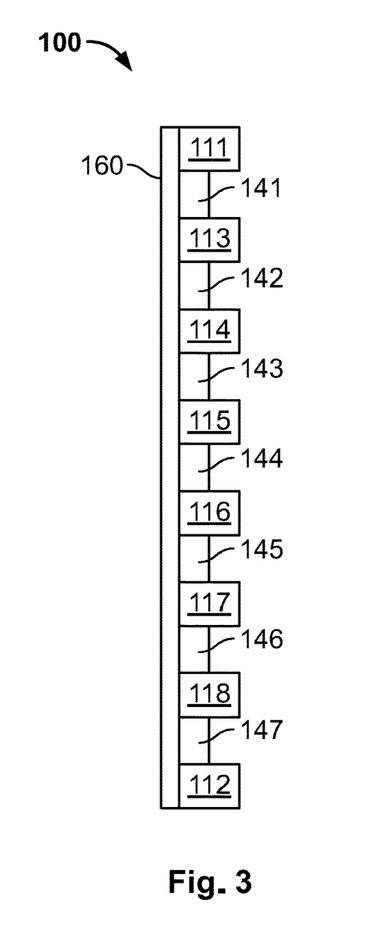
FIG. 3 is a side view of a measuring arrangement according to another embodiment on a printed circuit board.

A measuring arrangement 100 according to another embodiment is shown in FIG. 3. Like reference numbers indicate like elements, and only the differences from the measuring arrangement 100 shown in FIG. 1 will be described in detail herein.

The measuring arrangement 100 shown in FIG. 3 is arranged on a printed circuit board 160. Between the first magnetic switch 111 and the second magnetic switch 112, further magnetic switches are arranged, here a third magnetic switch 113, a fourth magnetic switch 114, a fifth magnetic switch 115, a sixth magnetic switch 116, a seventh magnetic switch 117 and an eighth magnetic switch 118. Further, seven resistors, a first resistor 141 between the first magnetic switch 111 and the third magnetic switch 113, a second resistor 142 between the third magnetic switch 113 and the fourth magnetic switch 114, a third resistor 143 between the fourth magnetic switch 114 and the fifth magnetic switch 115, a fourth resistor 144 between the fifth magnetic switch 115 and the sixth magnetic switch 116, a fifth resistor 145 between the sixth magnetic switch 116 and the seventh magnetic switch 117, a sixth resistor 146 between the seventh magnetic switch 117 and the eighth magnetic switch 118, and a seventh resistor 147 between the eighth magnetic switch 118 and the second magnetic switch 112, are arranged. The magnetic switches 111, 112, 113, 114, 115, 116, 117, 118 and the resistors 141, 142, 143, 144, 145, 146, 147 can be contacted with a circuit diagram analogous to that shown in FIG. 2.

Figure 4:
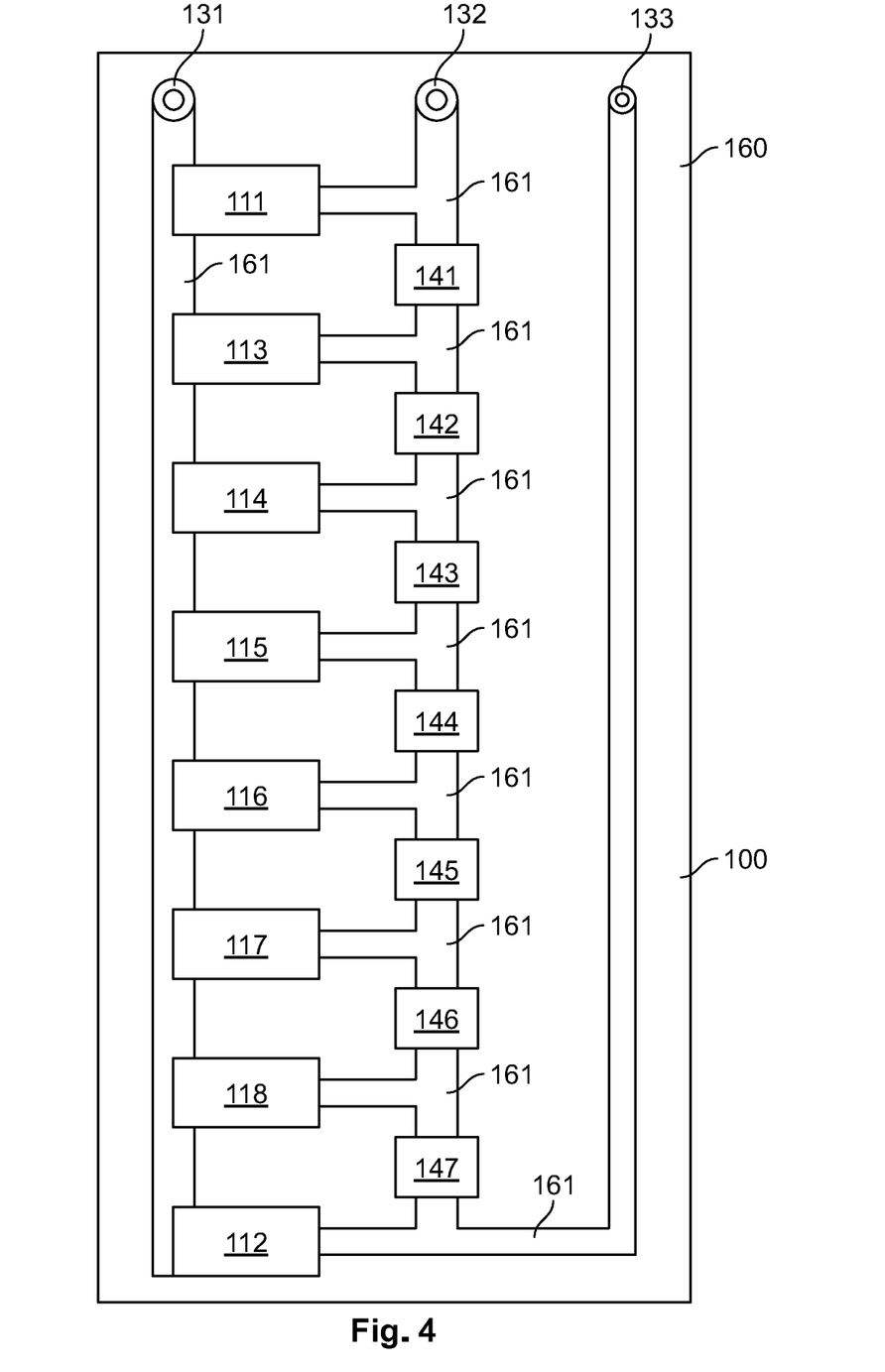
FIG. 4 is a front view of the measuring arrangement of FIG. 3.

FIG. 4 is a front view of the measuring arrangement 100 of FIG. 3 on the printed circuit board 160. The electrical contacting of a first evaluation terminal 131, a second evaluation terminal 132 and a third evaluation terminal 133 and the magnetic switches 111, 112, 113, 114, 115, 116, 117, 118 and the resistors 141, 142, 143, 144, 145, 146, 147 takes place via conductor paths 161. If a magnetic field moves along the magnetic switches 111, 113, 114, 115, 116, 117, 118, 112, the magnetic switches 111, 113, 114, 115, 116, 117, 118, 112 are correspondingly switched on and between the first evaluation terminal 131 and the second evaluation terminal 132 or between the first evaluation terminal 131 and the third evaluation terminal 133, a resistance value can be tapped to which the position of the switched-on magnetic switch 111, 113, 114, 115, 116, 117, 118, 112 can be assigned.

In the embodiment of FIGS. 3 and 4, the magnetic switches 111, 112, 113, 114, 115, 116, 117, 118 are arranged in series. Furthermore, the magnetic switches 111, 113, 114, 115, 116, 117, 118, 112 are arranged equidistantly. It can also be provided that the magnetic switches 111, 113, 114, 115, 116, 117, 118, 112 are not arranged in series or not equidistantly or both not in series and not equidistantly. The evaluation terminals 131, 132, 133 can be designed as plugs or sockets. Alternatively, other embodiments are possible.

Figure 5:
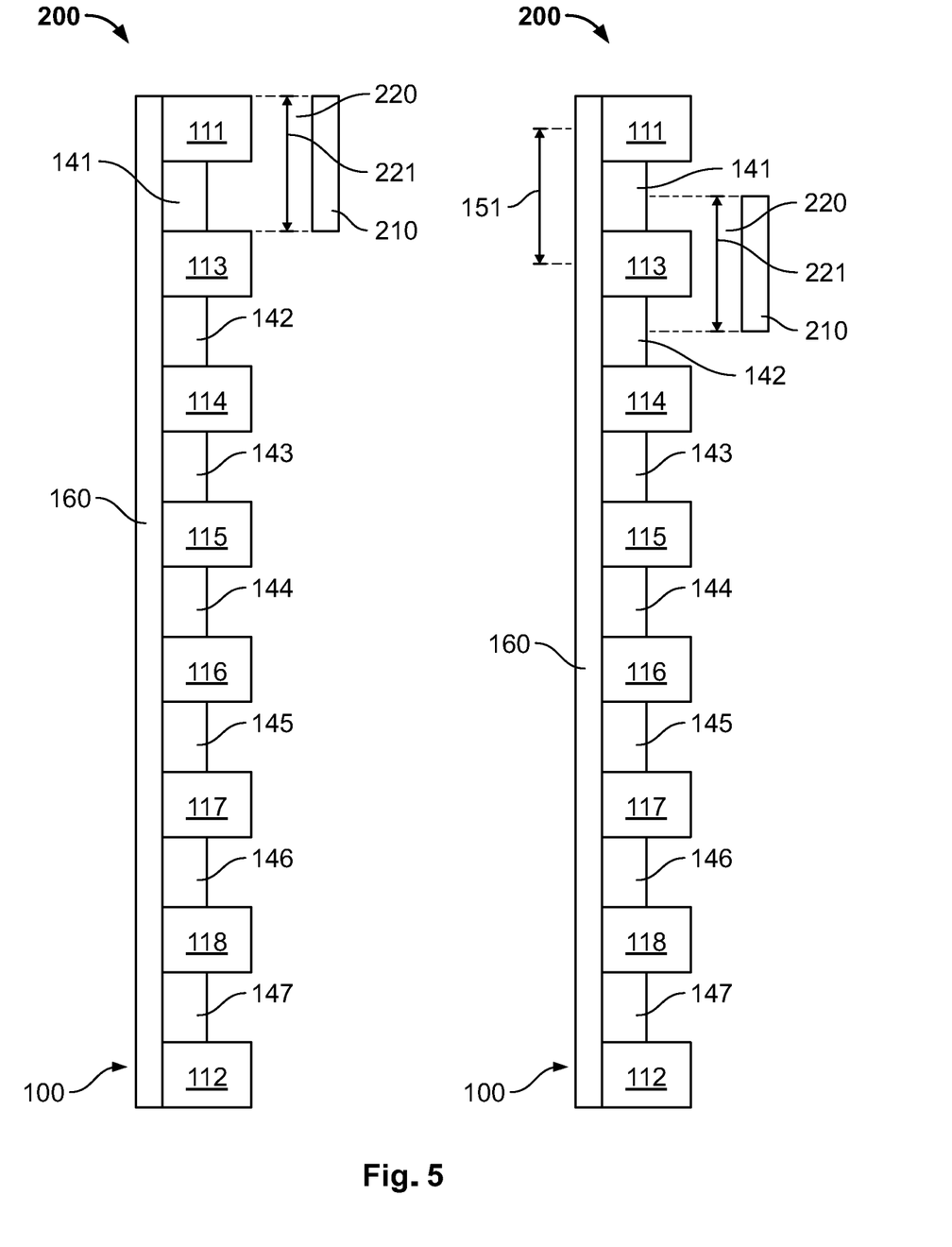
FIG. 5 is a side view of a measuring system according to another embodiment with a counterpart in two different positions.

A measuring system 200 according to an embodiment, as shown in FIG. 5, includes measuring arrangement 100, which corresponds to the measuring arrangement 100 of FIGS. 3 and 4, and a counterpart 210. The counterpart 210 has a magnetic field 220, which has a spatial extent 221. On the left in FIG. 5, the counterpart 210 is in a position in the region of the first magnetic switch 111, so that the first magnetic switch 111 is switched on. On the right in FIG. 5, the counterpart 210 is in a lower position in the region of the third magnetic switch 113. In this case, the magnetic field 220 would thus act on the third magnetic switch 113 and the third magnetic switch 113 would be switched on. The spatial extent 221 of the magnetic field 220 corresponds in this case to a first distance 151 between two adjacent magnetic switches 111, 113, 114, 115, 116, 117, 118, 112. The counterpart 210 has a specific gravity less than a specific weight of the fluid to be measured.

Figure 6:
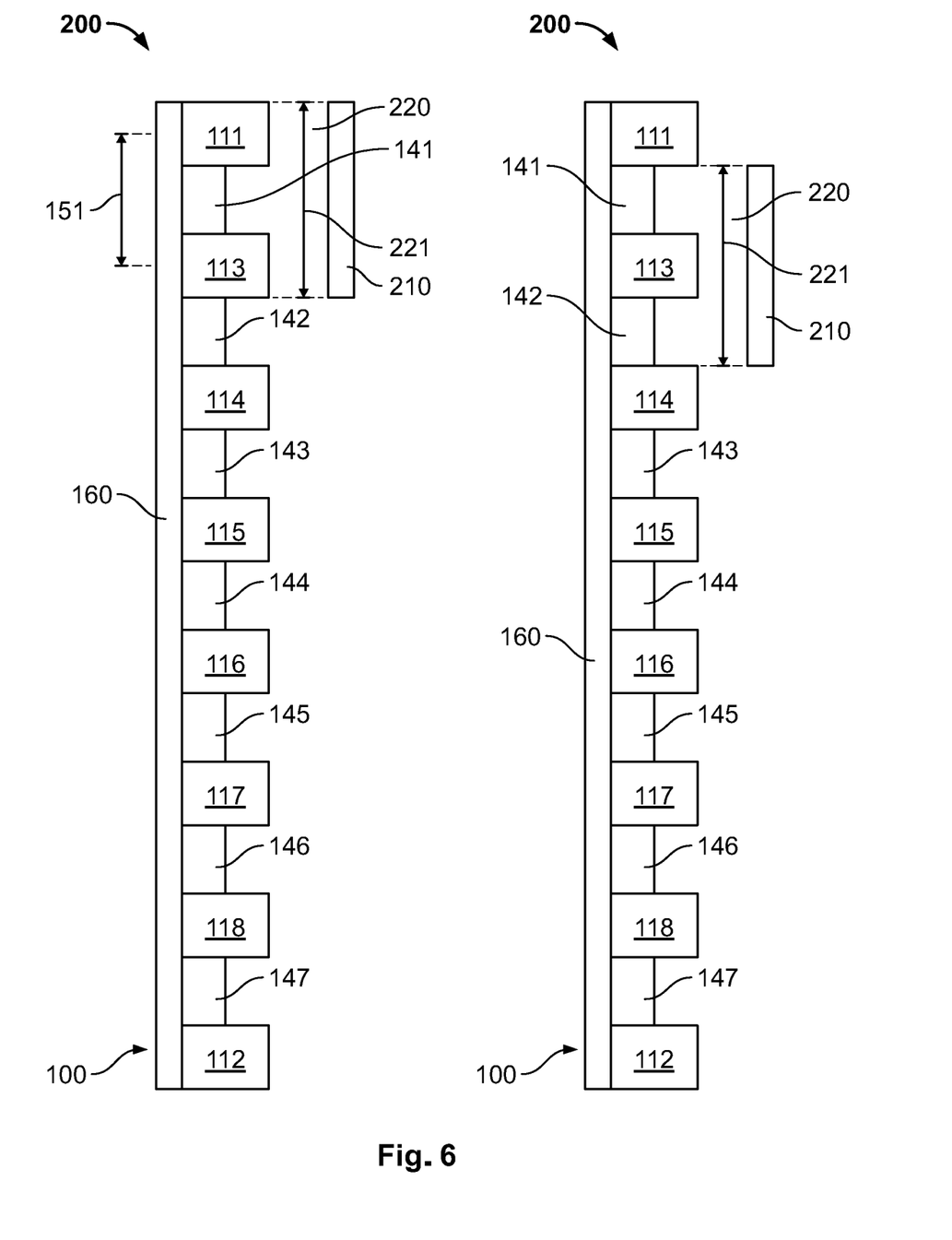
FIG. 6 is a side view of a measuring system according to another embodiment with a counterpart in two different positions.

A measuring system 200 according to another embodiment is shown in FIG. 6. Like reference numbers indicate like elements, and only the differences from the measuring system 200 shown in FIG. 5 will be described in detail herein.

The spatial extent 221 of the magnetic field 220, like the counterpart 210 in the measuring system 200 of FIG. 6, is greater than in the measuring system 200 of FIG. 5. The spatial extent 221 of the magnetic field 220 in FIG. 6 is greater than the first distance 151 and differs between 35 and 65 percent, in particular between 40 and 60 percent of the first distance 151 from a multiple of the first distance 151; i.e. the spatial extent 221 differs from twice the first distance 151, three times the first distance 151, etc. by 35 to 65 percent or 40 to 60 percent. In an embodiment, the spatial extent 221 of the magnetic field 220 of the counterpart 210 is a half-integer multiple of the first distance 151, such as 1.5, 2.5, 3.5 etc. times the first distance 151. In the embodiment shown in FIG. 6, the spatial extent 221 of the magnetic field 220 is 1.5 times the first distance 151. The spatial extent 221 of the magnetic field 220 can be understood to mean that within the spatial extent 221 the magnetic field is strong enough to switch the magnetic switches 111, 113, 114, 115, 116, 117, 118, 112. Outside the spatial extent 221, there may be a magnetic field which is not strong enough to switch the magnetic switches 111, 113, 114, 115, 116, 117, 118, 112.

On the left side of FIG. 6 is the counterpart 210, which is arranged in the region of the first magnetic switch 111 and the third magnetic switch 113. The first magnetic switch 111 and the third magnetic switch 113 of the measuring arrangement 100 are switched on by the magnetic field 220 of the counter-part 210. As a result, no resistance can be tapped between the first evaluation terminal 131 and the second evaluation terminal 132, while a resistance which corresponds to the sum of the second resistor 142 to the seventh resistor 147 can be tapped between the first evaluation terminal 131 and the third evaluation terminal 133. The first resistor 141 is short-circuited by the first magnetic switch 111 and the third magnetic switch 113 due to the acting magnetic field 220.

If the counterpart 210, as shown on the right side of FIG. 6, is moved along the measuring arrangement 100 in the direction of the third magnetic switch 113, a position results in which the magnetic field 220 can no longer exert any influence on the first magnetic switch 111. In this case, the magnetic field 220 switches only the third magnetic switch 113 on. Although this results in no difference for the resistance value between the first evaluation terminal 131 and the third evaluation terminal 133, a resistance corresponding to the first resistor 141 can now be tapped between the first evaluation terminal 131 and the second evaluation terminal 132. If the counterpart 210 now moves further in the direction of the fourth magnetic switch 114, a position is reached in which both the third magnetic switch 113 and the fourth magnetic switch 114 are switched on. This is not shown in FIG. 6, but again there is no difference in this position between the resistance value that can be measured between the first evaluation terminal 131 and the second evaluation terminal 132. Between the first evaluation terminal 131 and the third evaluation terminal 133, however, only one resistance value is measured, which corresponds to the sum of the third resistor 143 to the seventh resistor 147.

As a result, it is possible to increase the resolution of the measuring system 200 of FIG. 6 in comparison to the measuring system 200 of FIG. 5, so that either a higher measuring accuracy is achieved at the same cost for the measuring arrangement 100. Alternatively, the first distance 151 between the magnetic switches 111, 113, 114, 115, 116, 117, 118, 112 may be increased to achieve a consistent resolution. As a result, the production of the measuring system 200 can be less expensive because fewer magnetic switches are needed overall. This makes it possible to produce either a more accurate or a cheaper sensor. Both advantages can also be achieved simultaneously to a lesser extent.

Figure 7:
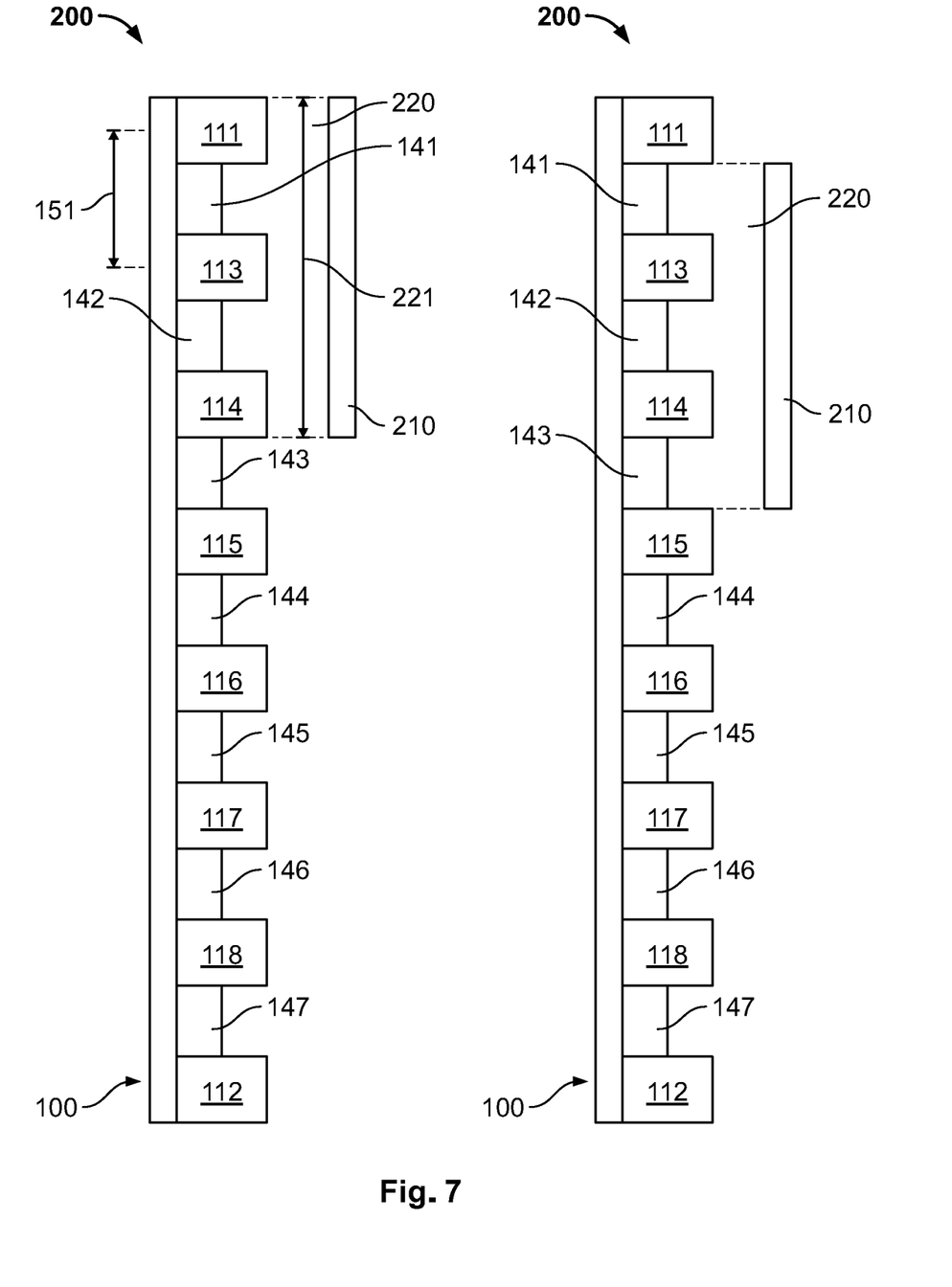
FIG. 7 is a side view of a measuring system according to another embodiment with a counterpart in two different positions.

In a measuring system 200 according to another embodiment, as shown in FIG. 7, the spatial extent 221 of the magnetic field 220 of the counterpart 210 corresponds to 2.5 times the first distance 151. This measuring system 200 also offers the advantageous improved resolution or the advantageously enlargeable first distance 151, analogous to the measuring system 200 of FIG. 6.

Figure 8:
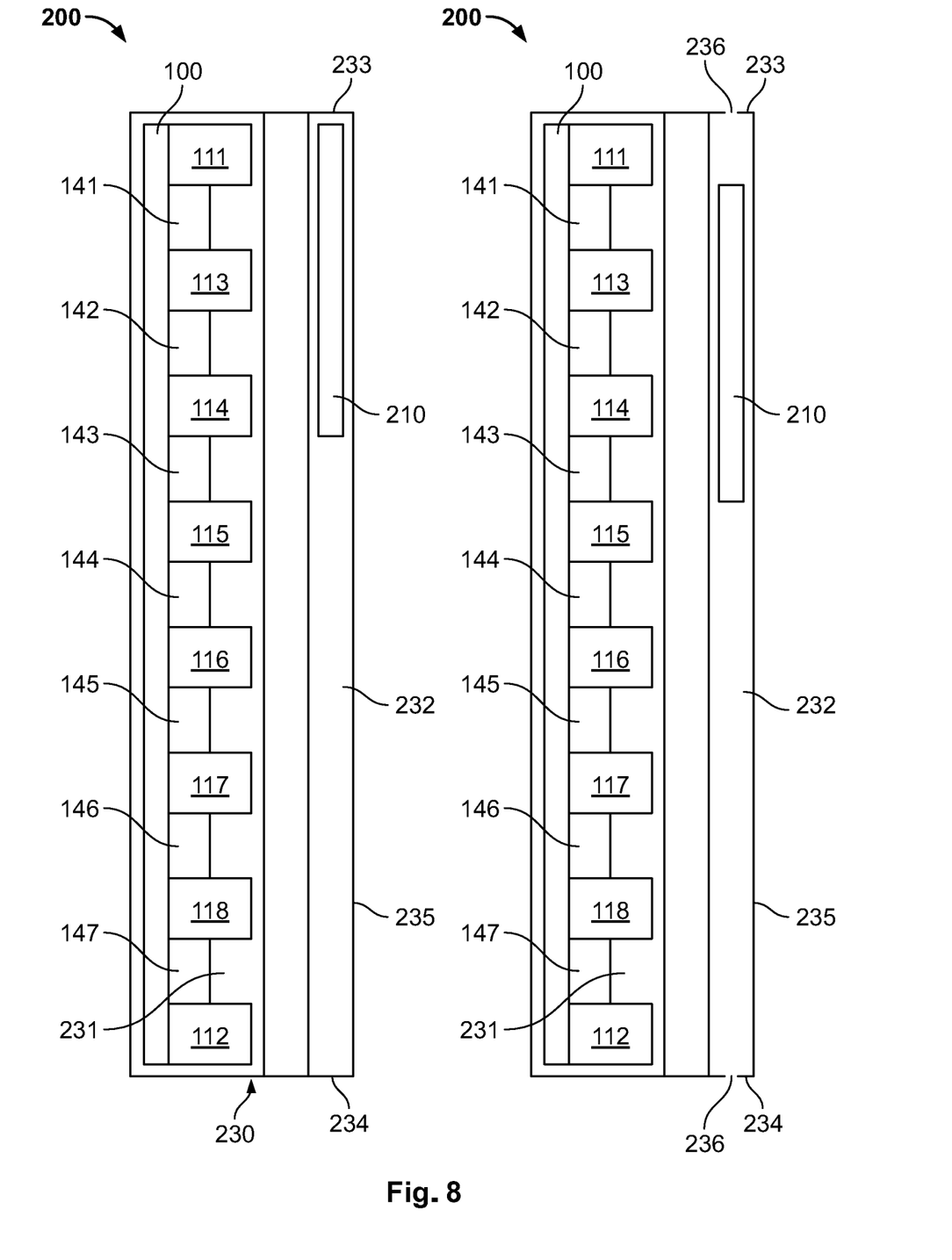
FIG. 8 is a side view of the measuring system of FIG. 7 arranged in a housing with the counterpart in two different positions.

FIG. 8 shows a cross-section through the measuring system 200 of FIG. 7. The measuring system 200 is arranged within a housing 230. The housing 230 has a first sub-housing 231 and a second sub-housing 232. The measuring arrangement 100 is arranged within the first sub-housing 231, and the counterpart 210 is arranged within the second sub-housing 232, such that the counterpart 210 can move along the measuring arrangement 100. The second sub-housing 232 has a top 233, a bottom 234 and a side wall 235. In order to measure the measuring system 200 as part of a liquid sensor, the first sub-housing 231 is fluid-tight around the measuring arrangement 100. Thus, a fluid to be measured cannot reach the measuring arrangement 100. As shown in FIG. 8 on the right side, an opening 236 may be provided, with which the interior of the second sub-housing 232 can be coupled to a fluid level. An opening 236 is provided on the top 233 and the bottom 234 of the second partial housing 232. Through these openings, a fluid level can penetrate into the second sub-housing 232 via the opening 236 on the bottom 234 and the air in the second sub-housing 232 can escape through the opening 236 at the top 233 of the second sub-housing 232. The counterpart 210 may be formed as a float, wherein the specific weight of the counterpart 210 is smaller than the specific weight of the liquid to be measured, so that the counterpart 210 floats on the surface of the liquid.

As an alternative to the openings 236 shown in FIG. 8, one or several openings may also be provided on the side wall 235. The openings 236 can be designed in all cases in such a way that, although the liquid to be measured can enter through the openings 236 in the second sub-housing 232, the counterpart 210 cannot be removed through the openings 236 from the second sub-housing 232. The counterpart 210 does not fit through the openings 236.

Figure 9:
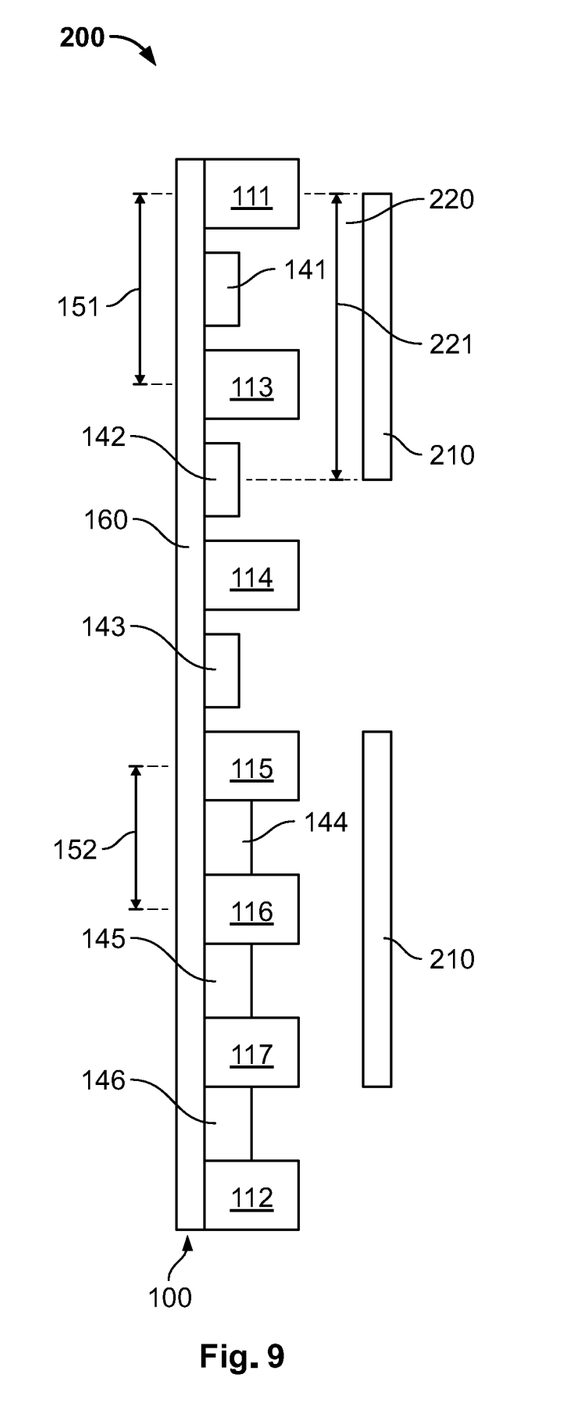
FIG. 9 is a side view of a measuring system according to another embodiment.

A measuring system 200 according to another embodiment, as shown in FIG. 9, comprises a measuring arrangement 100 and a counterpart 210. The measuring arrangement 100 has different distances 151, 152 between the magnetic switches 111, 113, 114, 115, 116, 117, 112. The magnetic switches 111, 113, 114, 115, 116, 117, 112 are arranged on a printed circuit board 160. Between a first magnetic switch 111 and a third magnetic switch 113, the third magnetic switch 113 and a fourth magnetic switch 114, and the fourth magnetic switch 114 and a fifth magnetic switch 115, a first distance 151 is present. Between the fifth magnetic switch 115 and a sixth magnetic switch 116, the sixth magnetic switch 116 and a seventh magnetic switch 117, and the seventh magnetic switch 117 and a second magnetic switch 112, a second distance 152 is present. A spatial extent 221 of a magnetic field 220 of a counterpart 210 likewise shown in FIG. 9 is 1.5 times the first distance 151 and 2.5 times the second distance 152. This is possible if the second distance 152 is 60 percent of the first distance 151.

With the measuring arrangement 100 shown in FIG. 9, on the one hand, the increased accuracy of the measuring arrangements described for FIGS. 5-7 can be achieved and, at the same time, a liquid sensor can be configured such that in a top area adjacent to the first magnetic switch 111 a greater distance of the magnetic switches 111, 113, 114, 115 is present than in a lower region adjacent to the second magnetic switch 112. This makes it possible, for example in a fuel tank, to achieve a more accurate measurement of declining fuel, while achieving a lower resolution in a fuller fuel tank. This allows a further cost reduction in the manufacture of the measuring arrangement 100 and thereby of the measuring system 200. The housing 230 of the measuring system 200 of FIG. 8 can also be used analogously for the measuring system 200 of FIGS. 5, 6 and 9.

Figure 10:
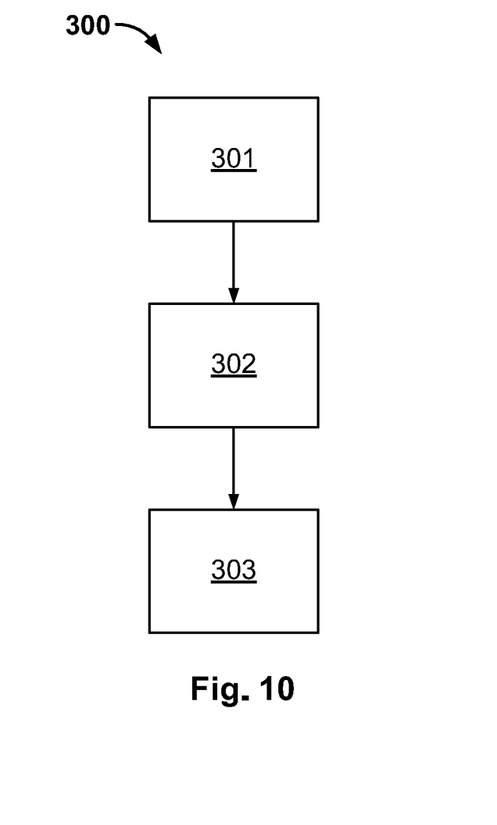
FIG. 10 is a flowchart of a process for determining a liquid level with a measuring arrangement.

A method for determining a liquid level in a measuring arrangement 100 is shown in FIG. 10. In a first measuring step 301, a first resistance value between a first evaluation terminal and a second evaluation terminal is determined. In a second measuring step 302, a second resistance value between the first evaluation terminal and a third evaluation terminal is determined. Subsequently, in a determination step 303, a fluid level is determined on the basis of the resistance values. As an alternative to the method shown in FIG. 10, the first measuring step 301 and the second measuring step 302 may also be performed simultaneously.

Figure 11:
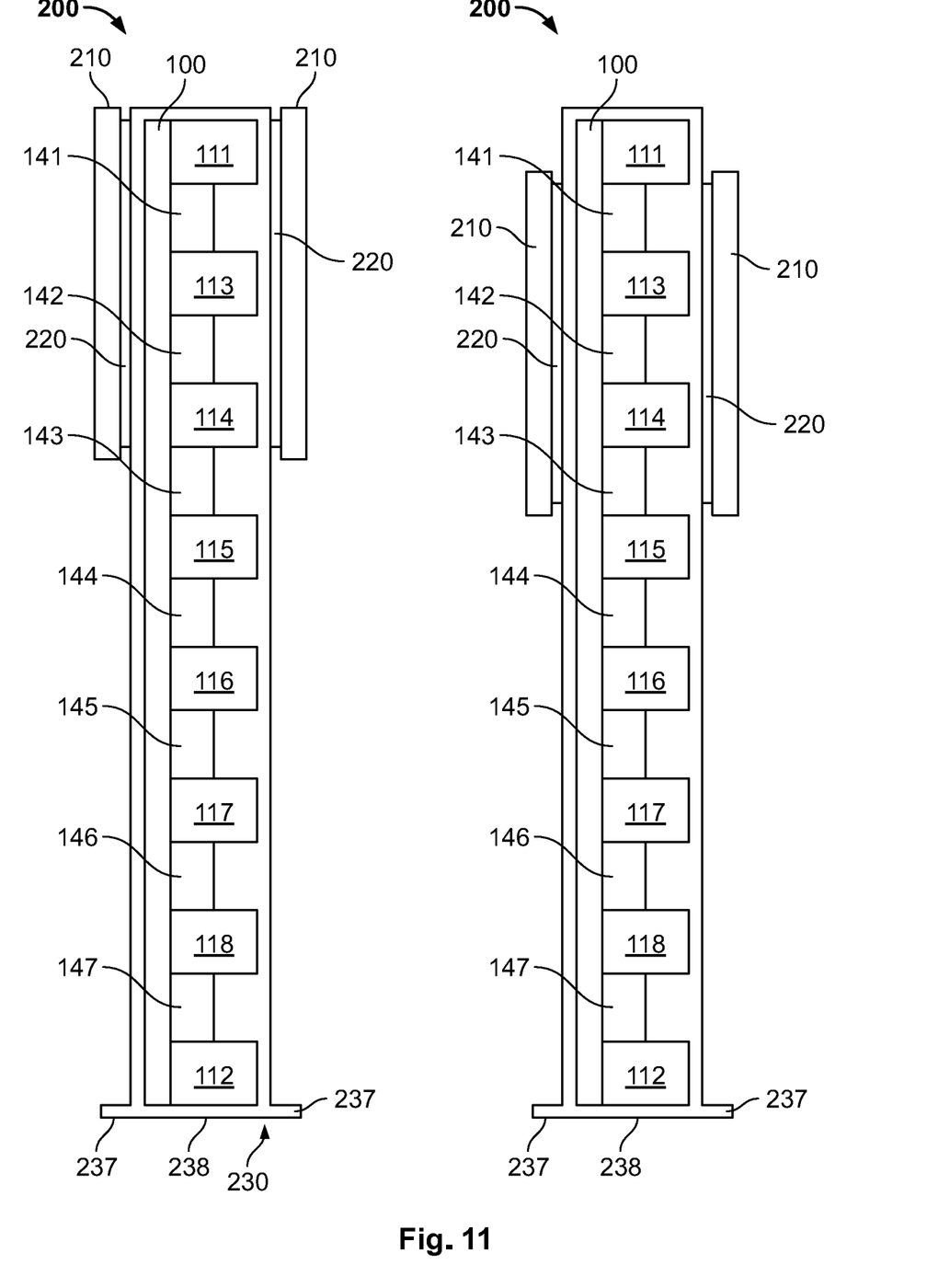
FIG. 11 is a side view of a measuring system according to another embodiment with a counterpart in two different positions.

A measuring system 200 according to another embodiment is shown in FIG. 11. The measuring system 200 shown in FIG. 11 differs from the measuring system 200 of FIG. 8 used by the housing 230 and the counterpart 210. The measuring arrangement 100 is arranged within the housing 230. The housing 230 is designed to be fluid-tight. The housing 230 is designed to be cylindrical or tubular. The counterpart 210 is designed to be annular and completely encloses the housing 230. As a result, the counterpart 210 is movable along the housing 230, but cannot be removed from the housing 230 transversely to this direction of movement. Also shown in FIG. 11 are optional supports 237 at a lower end 238 of the housing 230. The counterpart 210 is prevented by the supports 237 from moving beyond the lower end 238. The housing 230 may be designed to be liquid-tight.

In another embodiment, instead of the supports 237 shown in FIG. 11, the housing 230 may extend to a bottom of a container whose liquid level is to be measured. In this case, the bottom of the container can take over the function of the supports 237. In this case, two different positions of the counter-part 210 relative to the measuring arrangement 100 are again shown in FIG. 11.

Figure 12:
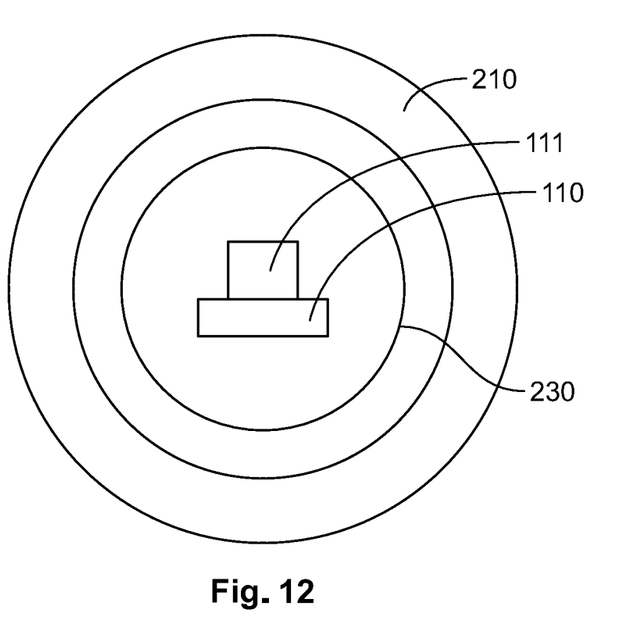
FIG. 12 is a sectional top view of the measuring system of FIG. 11.

FIG. 12 shows a further cross-section through the measuring system 200 of FIG. 11, through the first magnetic switch 111. The annular counterpart 210 is arranged around the housing 230.

As an alternative to the embodiments shown in FIGS. 11 and 12, the housing 230 may have a different shape and the counterpart 210 encloses the housing 230. The counterpart 210 may not completely enclose the housing 230, but at least partially encloses the housing 230.

The housing 230 of the measuring system 200 of FIGS. 11 and 12 can also be used analogously for the measuring system of FIGS. 5, 6 and 9.

In an embodiment, the first distance 151 and the second distance 152 may be in a range below fifteen centimeters, in particular below ten centimeters and or below six centimeters. These values are possible for all measuring systems 200 of FIG. 5-9 and 11 or 12 as well as for all measuring arrangements of FIGS. 1-4.

The above-described embodiments may be combined with each other unless the housing 230 shown in FIG. 8 is to be combined with the housing 230 shown in FIGS. 11 and 12. Furthermore, a number of magnetic switches greater than eight may also be provided. In the case of a measuring system provided for installation in a fluid tank, it may be provided that the first magnetic switch 111 is arranged at the top and the second magnetic switch 112 is arranged at the bottom, wherein the force of gravity acts downward.

In the embodiments of FIGS. 2-9, 11, and 12, the magnetic switches 111, 113, 114, 115, 116, 117, 118, 112 are switched on in the presence of a magnetic field and switched off in the absence of a magnetic field. The magnetic switches 111, 113, 114, 115, 116, 117, 118, 112 can be designed as reed switches.

In the embodiments of FIG. 8 or 11 and 12, the housing 230 may comprise a non-magnetic material such as stainless steel and/or a plastic and be made of stainless steel or plastic.

What is claimed is:

1. A method for measuring a fluid level, comprising:
providing a measuring arrangement including a first magnetic switch having a first contact and a second contact, a second magnetic switch having a first contact and a second contact, a first evaluation terminal connected to the first contact of each of the first magnetic switch and the second magnetic switch, a first resistor arranged between the second contact of the first magnetic switch and the second contact of the second magnetic switch, a second evaluation terminal connected to the second contact of the first magnetic switch, and a third evaluation terminal connected to the second contact of the second magnetic switch;
measuring a first resistance value between the first evaluation terminal and the second evaluation terminal;

measuring a second resistance value between the first evaluation terminal and the third evaluation terminal; and determining the fluid level based on the first resistance value and the second resistance value, both the first resistance value and the second resistance value vary as the fluid level varies.

2. The method of claim 1, further comprising arranging the measuring arrangement on a printed circuit board.

3. The method of claim 1, further comprising switching on the first magnetic switch or the second magnetic switch as a counterpart having a magnetic field moves in a first direction along the first magnetic switch and the second magnetic switch.

4. The method of claim 3, further comprising arranging a plurality of further resistors along the first direction with the first resistor.

5. The method of claim 4, further comprising providing a plurality of further magnetic switches each having a first contact and a second contact.

6. The method of claim 5, wherein the second contact of each of the further magnetic switches is arranged between a pair of resistors of the first resistor and the plurality of further resistors.

7. The method of claim 6, wherein the first contact of each of the further magnetic switches is connected to the first evaluation terminal.

8. The method of claim 5, wherein the first magnetic switch, the second magnetic switch, and each of the plurality of further magnetic switches are arranged in series.

9. The method of claim 8, wherein the first magnetic switch, the second magnetic switch, and each of the plurality of further magnetic switches are arranged equidistantly.

10. The method of claim 4, wherein the first resistor and each of the plurality of further resistors are identical.

11. The method of claim 3, wherein a specific weight of the counterpart is less than a specific weight of a fluid to be measured having the fluid level.

12. The method of claim 3, further comprising providing a housing having a first sub-housing and a second sub-housing.

13. The method of claim 12, wherein the measuring arrangement is disposed within the first sub-housing and the first sub-housing is fluid-tight about the measuring arrangement.

14. The method of claim 13, wherein the counterpart is arranged within the second sub-housing and is movable along the measuring arrangement.

15. The method of claim 14, wherein the second sub-housing has an opening allowing fluid to enter the second sub-housing while preventing removal of the counterpart from the second sub-housing.

16. The method of claim 3, further comprising providing a housing, the measuring arrangement is arranged within the housing and the counterpart at least partially surrounds the housing, the housing is fluid-tight around the measuring arrangement.

17. The method of claim 3, wherein the first magnetic switch and the second magnetic switch are spaced apart in the first direction by a distance that is less than a spatial extent of the magnetic field of the counterpart along the first direction.

18. The method of claim 17, wherein the spatial extent differs by 35 to 65 percent from a multiple of the first distance.

19. The method of claim 18, wherein the spatial extent is a half-integer multiple of the first distance.

20. The method of claim 17, wherein a separation of the first magnetic switch and the second magnetic switch extends across the measuring arrangement in a second direction perpendicular to the first direction.

* * * * *